United States Patent
Birch et al.

(10) Patent No.: US 10,387,660 B1
(45) Date of Patent: *Aug. 20, 2019

(54) COMPUTATIONAL OPTICAL PHYSICAL UNCLONABLE FUNCTION

(71) Applicant: National Technology & Engineering Solutions of Sandia, LLC, Albuquerque, NM (US)

(72) Inventors: Gabriel Carlisle Birch, Albuquerque, NM (US); Charles Fredrick LaCasse, IV, Albuquerque, NM (US); John Clark Griffin, Albuquerque, NM (US); Christian Turner, Albuquerque, NM (US); Amber Lynn Dagel, Albuquerque, NM (US); Bryana Lynn Woo, Socorro, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 166 days.

This patent is subject to a terminal disclaimer.

(21) Appl. No.: 15/295,356

(22) Filed: Oct. 17, 2016

(51) Int. Cl.
*H04K 1/00* (2006.01)
*G06F 21/60* (2013.01)

(52) U.S. Cl.
CPC .......... *G06F 21/602* (2013.01); *G06F 21/606* (2013.01); *H04L 2209/08* (2013.01); *H04L 2209/12* (2013.01)

(58) Field of Classification Search
CPC . G06F 21/602; G06F 21/606; H04L 2209/12; H04L 2209/08
USPC ........................................................ 380/256
See application file for complete search history.

(56) References Cited

U.S. PATENT DOCUMENTS

| | | | |
|---|---|---|---|
| 2015/0070555 A1* | 3/2015 | Guicquero | H04N 5/3745 348/308 |
| 2015/0317806 A1* | 11/2015 | Bernal | G06T 11/006 382/233 |
| 2016/0178720 A1* | 6/2016 | Mailhe | G01R 33/5611 324/309 |

OTHER PUBLICATIONS

F. Armknecht, R. Maes, A. Sadeghi, O.-X. Standaert, and C. Wachsmann. A formalization of the security features of physical functions. 2011 IEEE Symposium on, pp. 397-412. In Security and Privacy (SP), May 2011.
T. Bauer and J. Hamlet. Physical unclonable functions: A primer. IEEE, 12(6):97-101, Security Privacy, Nov. 2014.
Mark A. Davenport, Marco F Duarte, YC Eldar, and G. Kutyniok. Introduction to compressed sensing. In Compressed Sensing: Theory and Applications. Cambridge University Press, 2011.
Rob Fergus, Antonio Torralba, and William T Freeman. Random lens imaging. 2006.

(Continued)

*Primary Examiner* — Mohammad W Reza
(74) *Attorney, Agent, or Firm* — Daniel J. Jenkins

(57) ABSTRACT

A system or method for encryption of data includes a light source, a random optical element and a light detection element. The light source is arranged to transmit an input data signal to the random optical element. The light source is incident on the random optical element such that the input data signal is randomly scattered by the random optical element to generate an image at on the detector disposed at an output of the random optical element. The image received by the detector is applied to a compressive sensing algorithm to generate a transfer function. The transfer function defines a relationship between the input data signal and the image to enable estimation and reconstruction of the input data signal.

10 Claims, 4 Drawing Sheets

(56) References Cited

OTHER PUBLICATIONS

J. Guajardo, S.S. Kumar, G.-J. Schrijen, and P. Tuyls. Physical unclonable functions and public-key crypto for FPGA IP protection. International Conference on, pp. 189-195, Aug 2007. In Field Programmable Logic and Applications, 2007. FPL 2007.
Roarke Horstmeyer, Benjamin Judkewitz, Ivo M Vellekoop, Sid Assawaworrarit, and Changhuei Yang. Physical key-protected one-time pad. Scientific Reports, 3, 2013.
D. Lim, J.W. Lee, B. Gassend, G.E. Suh, M. Van Dijk, and S. Devadas. Extracting secret keys from integrated circuits. Very Large Scale Integration (VLSI) Systems, IEEE Transactions on, 13(10):1200-1205, Oct. 2005.
A. Maiti, J. Casarona, L. McHale, and P. Schaumont. A large scale characterization of RO-PUF. In Hardware-Oriented Security and Trust (HOST), 2010 IEEE International Symposium on, pp. 94-99, Jun. 2010.
G.E. Sufi and S. Devadas. Physical unclonable functions for device authentication and secret key generation. In Design Automation Conference, 2007. DAC '07. 44th ACM/IEEE, pp. 9-14, Jun. 2007.
Meng-Day Yu and S. Devadas. Secure and robust error correction for physical unclonable functions. Design Test of Computers, IEEE, 27(1):48-65, Jan 2010.
Gabriel Birch, "Computational and Design Methods for Advanced Imaging"; Dissertation, U. of Arizona College of Optical Sciences, 2012.

* cited by examiner

COMPUTATIONAL OPTICAL PHYSICAL UNCLONABLE FUNCTION

STATEMENT REGARDING FEDERALLY SPONSORED RESEARCH OR DEVELOPMENT

This invention was developed under Contract DE-AC04-94AL85000 between Sandia Corporation and the U.S. Department of Energy. The U.S. Government has certain rights in this invention.

BACKGROUND

The application generally relates to a device and method for cryptography. The application relates more specifically to a device and method of a computational optical physically unclonable function (COPUF).

Physical unclonable functions (PUFs) are tools used in cryptography to create easily observed but difficult to predict outputs tied to the physical properties inherently unique to a particular device. Most PUF technology has focused on electrical systems, but electrical systems require the presence of embedded electronics. Alternative PUFs that rely on macro-scale interactions from optical effects, which are simpler to measure, have been explored. However, these optical PUFs are expensive and bulky, and have traditionally required coherent illumination (i.e., lasers). A PUF is needed that can be utilized where electronic PUFs cannot, or in applications where custom embedded electronics are not available, all while using cost-effective components.

A physical unclonable function (PUF) is a system that embeds a unique fingerprint into a device, either using existing hardware structures (intrinsic PUFs), or by purposely introducing a random element into a system (extrinsic PUFs). These devices have numerous cryptographic applications across many domains of security. Integrated circuit (IC) PUFs have been studied and implemented. IC PUFs have many advantages, but require the presence of integrated circuits (ICs). Photonic based PUFs fall into two categories: coating-based PUFs and optical PUFs. Coating-based PUFs include a coating that may be applied to an RFID device, or tag, and attached to an item. Optical PUFs rely on speckle statistics which requires coherent illumination. However, current optical PUFs suffer from a number of practical deficiencies, including sensitivity to the alignment of the laser or coherent light source and the use of bulky and expensive components.

SUMMARY

The following is a brief summary of subject matter that is described in greater detail herein. This summary is not intended to be limiting as to the scope of the claims.

In one aspect a method of encrypting data includes illuminating an optical element with an array of discrete light points corresponding to a piece of data; converting the data via the optical element into a randomized light pattern; detecting the randomized light pattern output by the optical element; and determining a transfer function between the data and the randomized light pattern.

In another aspect a secure method of communication and authentication of data is disclosed. The method includes providing at least two optical PUF devices, including a first optical PUF and a second optical PUF, the optical PUF devices disposed in serial relationship; determining a first transfer function of the first optical PUF and the second optical PUF, respectively, in a first direction, the first optical PUF and the second optical PUF disposed in series; providing the first transfer function to a device at a receiving location for receiving a message encoded via a random optical element, the receiving location remote from a sending location; and reconstructing the message by applying the first transfer function to the encoded message.

In one embodiment, an encryption system is disclosed. The encryption system includes a light source, a random optical element and a light detection element. The light source is arranged to transmit an input data signal to the random optical element. The light source is incident on the random optical element such that the input data signal is randomly scattered by the random optical element to generate an image on the detector disposed at an output of the random optical element. The image received by the detector is applied to a minimization algorithm to generate a transfer function. The transfer function defines a relationship between the input data signal and the image to enable estimation and reconstruction of the input data signal.

Instead of relying on speckle statistics, which requires a coherent illumination (i.e., laser light), the disclosed system uses compressive imaging and computational imaging to create a lensless-imaging system utilizing incoherent, polychromatic illumination. A laser or expensive spatial light modulator is not required to operate the system. Because of the computational imaging aspects of the COPUF, unique properties of the system enable secure communication and authentication between parties.

The COPUF device and system utilizes an optical system to create a small, inexpensive, and easily manufactured optical PUF that enables secure communication and authentication. This device utilizes the principles of computational imaging to miniaturize and simplify the optical PUF design, and to increase robustness to outside environmental changes. The computational optical PUF (COPUF) enables secure communication between two or more parties after an initial calibration, and assures authenticity of communication provided both parties possess their COPUF. Preliminary simulations show the plausibility of an optics-based and device-specific encryption system The computational optical PUF (COPUF) uses principles of computational or compressive imaging to create a simpler, smaller, and less expensive optical PUF, while enabling novel applications or use cases, such as secure data communication. Importantly, the proposed optical PUF does not fall within either of the previously discussed optical PUF categories; we propose an entirely new category of optical PUF.

Other aspects will be appreciated upon reading and understanding the attached figures and description.

BRIEF DESCRIPTION OF THE FIGURES

The application will become more fully understood from the following detailed description, taken in conjunction with the accompanying figures, wherein like reference numerals refer to like elements, in which.

DETAILED DESCRIPTION OF THE EXEMPLARY EMBODIMENTS

Figure 1:
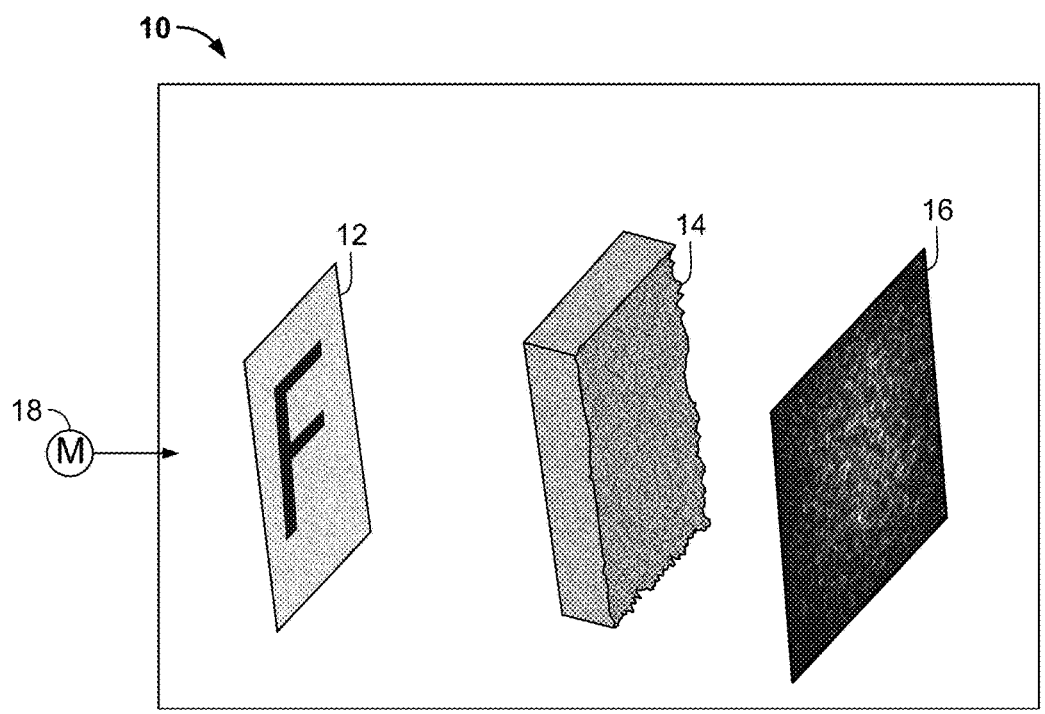
FIG. 1 is an exemplary embodiment of a Computational Optical Physically Unclonable Function (COPUF) system.

Various technologies pertaining to computational optical physically unclonable functions (COPUFs) will now be described with reference to the drawings, where like reference numerals represent like elements throughout. It is to be understood that the term "exemplary", as used herein, is defined as serving as an illustration or example, and is not intended to indicate a preference. It should be understood that the application is not limited to the details or methodology set forth in the following description or illustrated in the figures. It should also be understood that the phraseology and terminology employed herein is for the purpose of description only and should not be regarded as limiting.

Referring to FIG. 1, a COPUF system 10 includes a light source 12 for transmitting input data 18 by illuminating a random optical element 14. The data is, e.g., data that is to be securely transmitted to a trusted receiver. Light source 12 may be, for example, a liquid crystal display (LCD) source or an equivalent light-emitting array. System 10 relies on incoherent illumination from a polychromatic light source 12 to transmit data 18, i.e., speckle is not induced in the system as in existing optical PUFs that rely on coherent laser light sources, and does not include a lens. Data 18 may be transmitted in the form of, e.g., a binary message encoded in an N×M LCD array. Randomized optical element 14, may be, e.g., a random-scattering refractive or reflective optical element. In one exemplary embodiment randomized optical element 14 may be a ground glass plate. In another exemplary embodiment randomized optical element 14 may be a layer of opalized glass, or a virtual ROE generated in a 3D software simulation. When light source 12 is incident on randomized optical element 14, data 18 is random scattered and the scattered image of the data is received by a detector 16. Detector 16 captures an image K×P, where K×P represents K rows by P columns, and wherein K×P can be greater than, equal to, or lesser than N×M of the original encoded message. The detector size does not have to be equal to that of the message size.

When a pattern is displayed on light source 12, photons emanating light source 12 are scattered by random optical element 14, and intensity is measured at corresponding array points on detector 16. Calibration measurements are performed to determine the original message displayed by LCD source 12, whereby known patterns are displayed by the LCD and images of the resulting scattered photons are acquired by detector 16. Using minimization techniques based on computational sensing techniques or algorithms, a transfer function between an object, i.e., the random optical element 14, and image, i.e., the resulting collection of photons on detector 16 after photons from the object pass through the optical element 14, may be estimated, or reconstructed, to establish a transfer function $T_{AB}$. Transfer function $T_{AB}$ captures the random but fixed scattering nature of the random optical element 14. Transfer function $T_{AB}$ may be computed, e.g., via a general purpose computer or other microprocessor-based device having embedded software (not shown). A compressive sensing algorithm is a class of minimization solvers. In one embodiment a compressive sensing technique or a general minimization algorithm may be used to establish transfer function $T_{AB}$.

Figure 2:
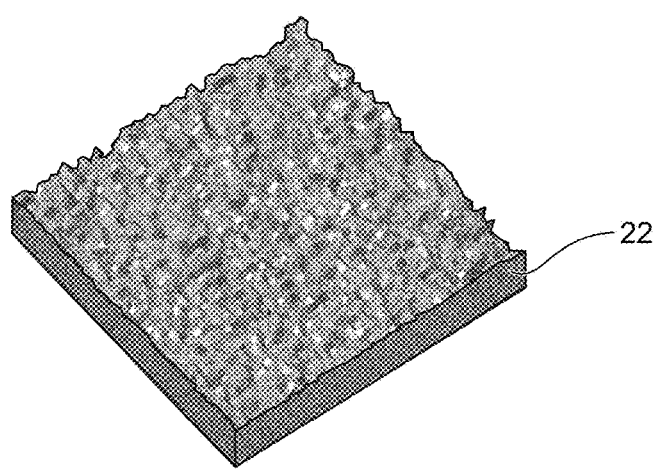
FIG. 2 is an exemplary embodiment of a simulated COPUF system.

Referring next to FIG. 2, the COPUF system may be simulated system utilizing Matlab, Zemax non-sequential raytrace simulations, and Blender to generate three dimensional (3D) random scattering surfaces. In one exemplary embodiment a 3D modeling program such as Blender 3D open source modeling program may be used to generate a rectangle object with a surface map altered by a random binary mask, to generate a random scattering surface 22 with gross surface features as shown in FIG. 2. The virtual object is then exported into a common 3D model format, and imported into an optical raytrace program, e.g., Zemax an optical system design program, to create traditional imaging systems.

Figure 3:
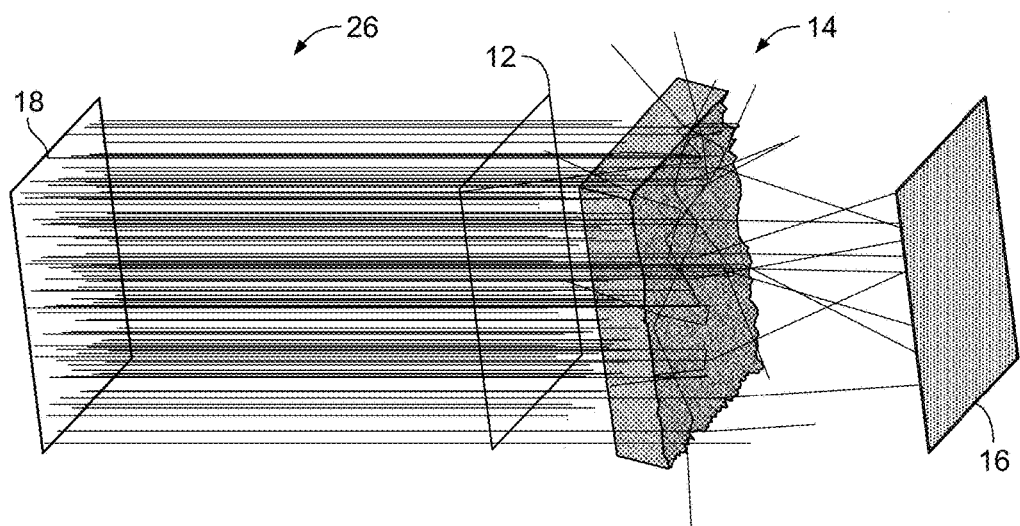
FIG. 3 shows a non-sequential raytrace used to simulate a fully functioning COPUF.
Figure 4:
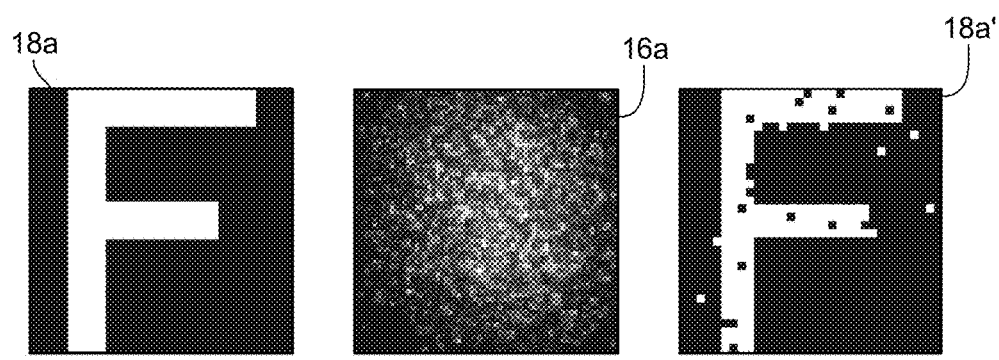
FIG. 4 shows an example result of the calibration process.

Referring next to FIG. 3, non-sequential raytrace abilities may be used to simulate a fully functioning COPUF. In the exemplary embodiment simulation is defined by the ability of a user to specify a pattern of interest, which passes through the random scattering surface exported from the 3D model, and then is incident on a detector as shown in FIG. 4. In the exemplary embodiment shown in FIG. 4 the model was developed within Zemax non-sequential raytrace. The model enables inputting a user defined pattern on the slide object and performing a raytrace simulation of the resulting photons that are collected by the detector surface after rays pass through the random scattering surface developed in Blender.

In an exemplary embodiment the method enables the development of a calibration library of known input patterns, and simulated raytrace detector data. By simulating multiple patterns it is possible to take these inputs and outputs and using minimization algorithms, such as L1-norm minimization, basis pursuit denoising, or other minimization techniques, determine a transfer function between the two data sets. Optical system minimization algorithms are known to those having skill in the art. One embodiment of minimization algorithms useful in this method are those from compressive sensing. Compressive sensing, also referred to as compressive sampling or sparse sampling, is a signal processing technique for efficiently acquiring and reconstructing a signal, by finding solutions to underdetermined linear systems. Compressive sensing enables measurements to be made with less information than anticipated by the Nyquist-Shannon sampling theorem, and can be leveraged to create a variety of optical systems that seem counter-intuitive, or are impossible without the principles of compressive sensing. In one embodiment, a compressive sensing algorithm that may be used to determine a transfer function for a COPUF is the minimization of the L1-norm. The disclosed method automatically assigns random but known inputs into a user defined COPUF simulation, initiate a raytrace, and store the resulting output of the simulation in a computer memory device (not shown). Automation enables rapid development and testing of different design configurations of unique COPUFs entirely within a virtual environment. FIG. 4 shows one example result of the calibration process.

In one embodiment the transfer function solver procedure will be to measure the system response function, which is described in Equation 1:

$$B_{Measured\ Data} = TX_{scene} \qquad [\text{Equation 1}]$$

where B is the measured data, T is the system response, and X is the scene to be measured. The system response function describes how the detector will respond to an arbitrary scene. The system response can be measured by displaying a series of known scenes as described above.

One example technique to find the system response is described as follows: Assume that the pixel response will be calculated on a per detector pixel basis, using a stack of input scenes that is k long. The data reduction can be performed by arranging the input scenes into an array A that is of size n×k, where n is the number of input pixels and k is the number of input scenes. B becomes a vector of size k, and T is the system response matrix, or transfer function, that maps the response of the single detector pixel from each input pixel n, so it is a column vector of length n. The response matrix for pixel i can be found by solving Equation 2:

$$A*T_i - B_i = 0 \quad \text{[Equation 2]}$$

using data reduction methods. Non-limiting examples of data reduction methods include least squares or basis pursuit algorithms.

Figure 5:
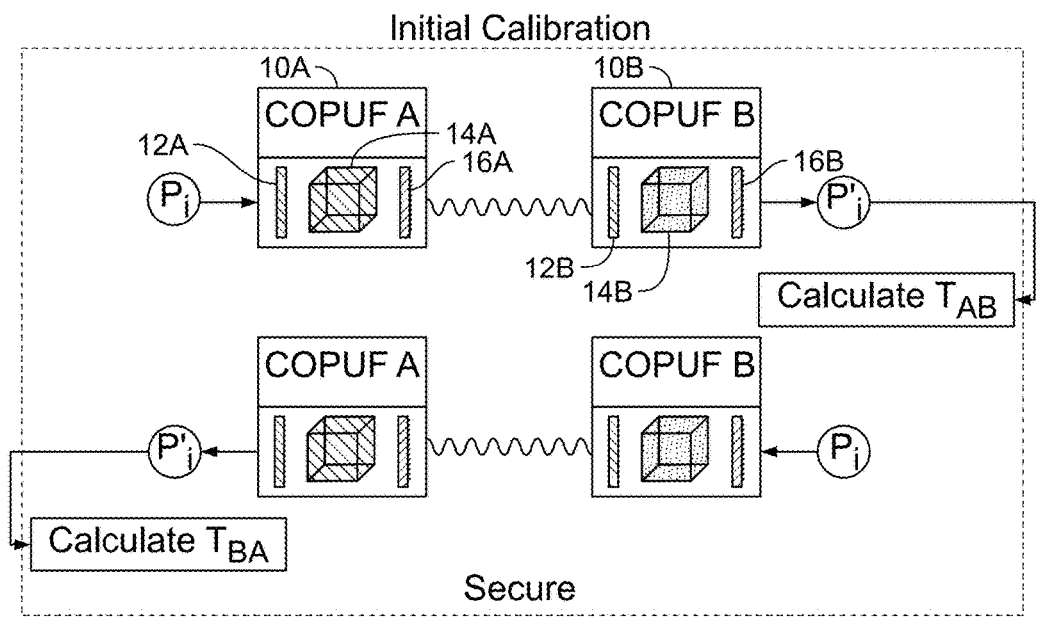
FIG. 5 is an exemplary method for secure data transfer

Referring next to FIG. 5, a method is disclosed for secure data transfer. Using a serial pair of COPUFs 10A and 10B, and a novel calibration process to create a pair of devices, secure communication is enabled between both COPUF systems without an individual system being characterized at any point in the lifecycle. One advantage is that a total system transfer function may be stored in a public domain without compromising secure communication of the calibrated pair. Two COPUF systems, COPUF A, and COPUF B are calibrated as follows: a known pattern, $p_i$, is displayed by LCD source 12A, passes through random scattering object 14A, and is incident upon detector 16A to generate data that is transferred to COPUF B. Data that is transferred to COPUF B is displayed on LCD source 12B, which then passes through the random scattering object 14B, and is incident upon detector 16B. By passing through a series of known $p_i$ patterns and taking the outputs, $p'_i$, a transfer function, $T_{AB}$, can be estimated using compressive sensing techniques or other minimization algorithms. Transfer function $T_{AB}$ enables COPUF B to reproduce messages from COPUF A. The process is repeated in reverse to enable COPUF B to COPUF A calibration. The calibration process develops a public transfer function much like a public key pair dictionary in a one-time-pad protocol.

Figure 6:
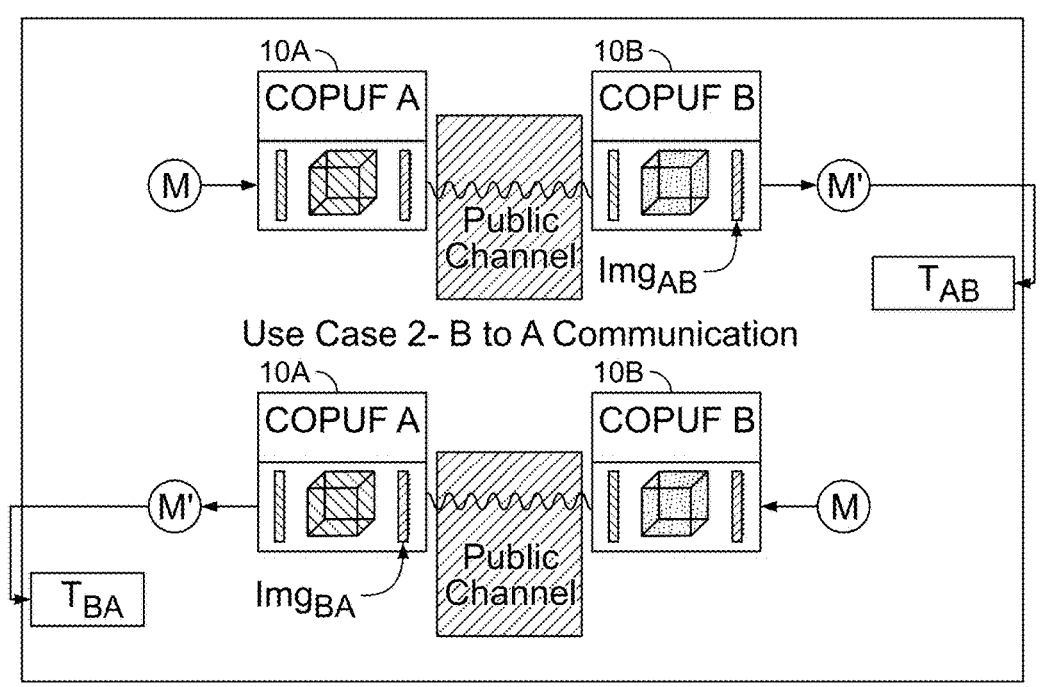
FIG. 6 shows an exemplary method of secure communication.

Referring next to FIG. 6, one example of the secure communication method is disclosed. Between COPUF A and COPUF B, a message, M, is displayed by the LCD screen, scattered through the random scattering object, and incident upon the detector. Detector output data is then sent over a non-secured network or medium to COPUF B (10B), displayed on LCD 12B, passes through random scattering object 14B, and is incident upon detector 16B. Using the image output of COPUF B detector 16B, indicated as $Img_B$, the transfer function from COPUF A to COPUF B, $T_{AB}$, and the physical presence of COPUF A and COPUF B, it is possible to estimate message M.

The process can then be reversed and secure communication between COPUF B to COPUF A can take place. It is important to note that both transfer functions are unique i.e., $T_{AB}$ is not equal to $T_{BA}$. To eavesdrop on this communication it is necessary for the recipient of a message to by compromised, meaning ($Img_{AB}$, $T_{AB}$) or ($Img_{BA}$, $T_{BA}$) are known.

As described above, message M may only be decoded by the system if the original message passes through both a first COPUF A and a second COPUF B. If a message does not pass through both COPUF A and COPUF B, application of the system transfer function will yield useless signals. By calibrating COPUF A and COPUF B in serial pairs rather than as individual COPUFs, no data regarding any singular COPUF can be stored. In one exemplary embodiment described below, serial strings of COPUF devices may be calibrated using more than two COPUF devices to derive an overall system transfer function. The system transfer function, or functions, and intermediate images can be treated as public information since the formation of images through the random scattering PUFs is the key to the disclosed security protocol. Additionally, the disclosed security protocol maintains message authenticity by assuring it is impossible to send messages to COPUF B unless COPUF A is entirely compromised. As long as both parties physically possess COPUF A and COPUF B, message authenticity is assured.

Figure 7:
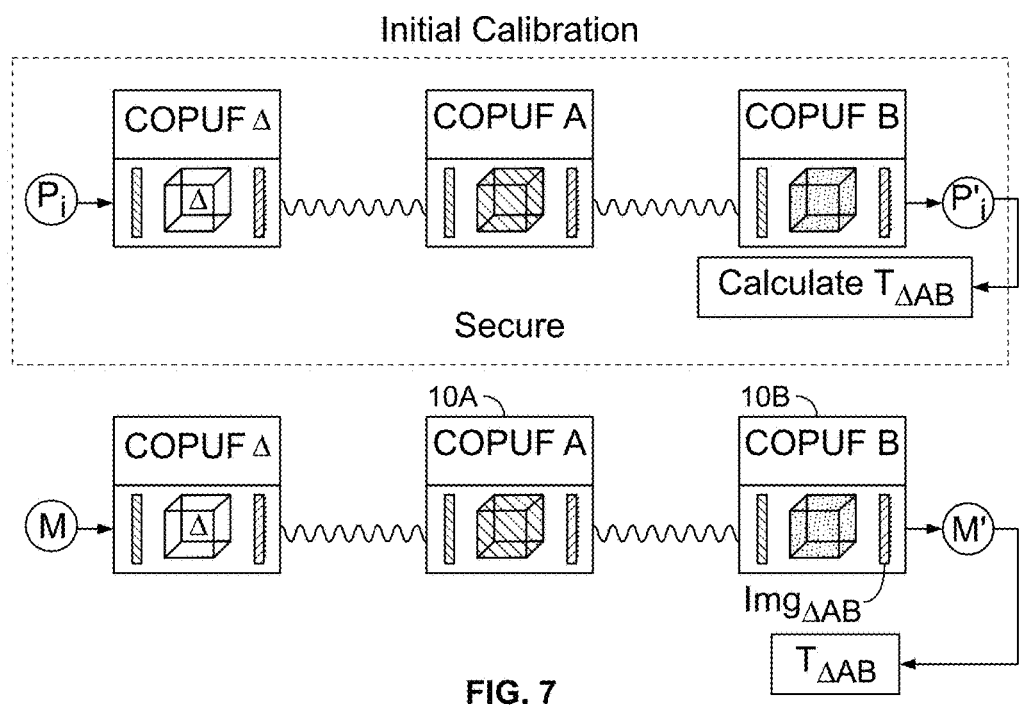
FIG. 7 is an alternate embodiment of the method of secure communication.

Referring to FIG. 7, an alternate embodiment is shown. If, for example, an untrustworthy manufacturer creates the COPUF subsystem, it would theoretically be possible to perform a calibration on an individual COPUF and determine messages sent by that user. This would require precise knowledge of individuals who use a specific COPUF, which seems unlikely. However, if trust in a system is absolutely necessary, it would be possible to insert a third COPUF at the beginning of the message chain. FIG. 7 shows a diagram of such a system. A trusted COPUF, called the D COPUF, is inserted at the beginning of the secure communication chain. Calibration is performed as outlined for the double COPUF case, and a unique transfer function is generated called $T_{DAB}$. When a command needs to be sent securely, it begins by passing through the D COPUF, then to COPUF A and COPUF B in serial. Even if COPUF A and COPUF B are fully characterized by a third party, there is no way to recover the original message, M, since it is scrambled by the D COPUF, which the user knows to be secure.

Using this double COPUF arrangement, it would be impossible to send commands to user B that appear to have come from user A unless COPUF A is completely compromised. Practically, this means that all communications received by a user can be trusted as true communication as long as both parties still possess their respective COPUF A or B. Even if $Img_{AB}$ or $Img_{BA}$ is compromised and ($Img_{AB}$, $T_{AB}$) or ($Img_{BA}$, $T_{BA}$) are known, it is impossible to create a false message for a user since message generation requires the physical presence of COPUF A and COPUF B.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processors, or by a special purpose computer processor for an appropriate system, incorporated for this or another purpose or by a hardwired system.

The construction and arrangement of the COPUF system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

It should be noted that although the figures herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

What is claimed is:

1. An encryption system comprising:
    a light source, a random optical element and a light detection element;
    the light source arranged to transmit an input data signal to the random optical element when the light source is incident on the random optical element, the input data signal is randomly scattered by the random optical element to generate an image at on the detector at an output of the random optical element; and the image received by the detector is applied to a compressive sensing algorithm to generate a transfer function that defines a relationship between the input data signal and the image to enable estimation and reconstruction of the input data signal.

2. The system of claim 1, wherein the light source comprises a liquid crystal display (LCD).

3. The system of claim 1, wherein the light source comprises a light-emitting array.

4. The system of claim 1, wherein the data signal comprises at least partially incoherent illumination.

5. The system of claim 1 wherein the random optical element comprises a refractive optical element.

6. The system of claim 1 wherein the random optical element comprises a reflective optical element.

7. The system of claim 1 wherein the random optical element comprises a ground glass plate.

8. The system of claim 1 wherein the random optical element comprises one or more layers of opalized glass.

9. The system of claim 1 wherein the random optical element comprises a virtual ROE generated via a three dimensional software simulation.

10. The system of claim 1 wherein the input data signal is a binary message encoded in an N×M array and the image is a K×P array, where K×P can be greater than and N×M of the input data signal.

* * * * *